United States Patent
Ranjan et al.

(10) Patent No.: US 11,057,289 B2
(45) Date of Patent: *Jul. 6, 2021

(54) MOBILE APPLICATION IDENTIFICATION IN NETWORK TRAFFIC VIA A SEARCH ENGINE APPROACH

(71) Applicant: The Boeing Company, Chicago, IL (US)

(72) Inventors: Gyan Ranjan, Sunnyvale, CA (US); Alok Tongaonkar, San Jose, CA (US); Ruben Torres, Sunnyvale, CA (US)

(73) Assignee: The Boeing Company, Chicago, IL (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/854,657

(22) Filed: Dec. 26, 2017

(65) Prior Publication Data
US 2018/0254968 A1    Sep. 6, 2018

Related U.S. Application Data

(63) Continuation of application No. 14/304,136, filed on Jun. 13, 2014, now Pat. No. 9,853,876.

(51) Int. Cl.
*H04L 12/26* (2006.01)
*H04L 29/08* (2006.01)
(Continued)

(52) U.S. Cl.
CPC ............ *H04L 43/10* (2013.01); *H04L 43/026* (2013.01); *H04L 43/028* (2013.01); *H04L 43/04* (2013.01);
(Continued)

(58) Field of Classification Search
CPC ....... H04L 43/00; H04L 43/02; H04L 43/022; H04L 43/026; H04L 43/04; H04L 43/045;
(Continued)

(56) References Cited

U.S. PATENT DOCUMENTS 7,620,988 B1 * 11/2009 Hernacki ............ H04L 63/0227
713/152
7,703,138 B2 * 4/2010 Desai .................. H04L 63/1416
370/252
(Continued)

OTHER PUBLICATIONS

Park et al., "Towards automated application signature generation for traffic identification," NOMS 2008—2008 IEEE Network Operations and Management Symposium, 2008, pp. 160-167 (Year: 2008).*

(Continued)

*Primary Examiner* — Atta Khan
*Assistant Examiner* — William C McBeth
(74) *Attorney, Agent, or Firm* — Kwan & Olynick LLP

(57) ABSTRACT

A method for identifying a network application. The method includes analyzing metadata and source code of a network application to extract a set of application tokens, generating an index document of the network application based on the set of application code tokens, wherein the index document is included in a library of index documents corresponding to a number of network applications, extracting a set of packet header tokens from a packet header of a packet in a flow, comparing the set of packet header tokens to the set of index documents to generate a number of match scores, wherein each match score represents a similarity measure between the set of packet header tokens and one index document, and determining, based on a highest match score corresponding to a particular network application, that the flow is generated by the particular network application.

20 Claims, 7 Drawing Sheets

(51) Int. Cl.
*H04L 12/851* (2013.01)
*H04L 12/859* (2013.01)

(52) U.S. Cl.
CPC .......... *H04L 67/34* (2013.01); *H04L 47/2441* (2013.01); *H04L 47/2475* (2013.01); *H04L 47/2483* (2013.01)

(58) Field of Classification Search
CPC ....... H04L 43/06; H04L 43/062; H04L 43/10; H04L 43/12; H04L 43/18; H04L 47/2441; H04L 47/2475; H04L 47/2483; H04L 43/028; H04L 63/0227; H04L 63/0236; H04L 63/0245; H04L 63/0254; H04L 63/1408; H04L 63/1416; H04L 63/1425; H04L 69/22
See application file for complete search history.

(56) References Cited

U.S. PATENT DOCUMENTS

| | | | |
|---|---|---|---|
| 8,180,916 B1 | 5/2012 | Nucci et al. | |
| 8,406,141 B1* | 3/2013 | Couturier | H04L 43/18 370/241 |
| 8,738,906 B1* | 5/2014 | Sampath | H04L 47/2441 713/166 |
| 9,152,694 B1* | 10/2015 | Padidar | H04L 63/1425 |
| 9,853,876 B1 | 12/2017 | Ranjan et al. | |
| 9,961,574 B1* | 5/2018 | Tubi | H04L 67/22 |
| 2004/0083299 A1* | 4/2004 | Dietz | H04L 47/2441 709/230 |
| 2004/0190526 A1* | 9/2004 | Kumar | H04L 47/2441 370/395.21 |
| 2005/0108573 A1* | 5/2005 | Bennett | H04L 63/0245 726/4 |
| 2010/0095367 A1* | 4/2010 | Narayanaswamy | H04L 63/0245 726/12 |
| 2010/0189129 A1 | 7/2010 | Hinosugi et al. | |
| 2010/0192225 A1* | 7/2010 | Ma | H04L 63/0227 726/23 |
| 2012/0239652 A1* | 9/2012 | Wood | H04L 69/22 707/737 |
| 2013/0194930 A1 | 8/2013 | Szabo et al. | |
| 2013/0246338 A1* | 9/2013 | Doddapaneni | H04L 69/22 707/602 |
| 2013/0294449 A1* | 11/2013 | Kim | H04L 69/22 370/392 |
| 2013/0347094 A1 | 12/2013 | Bettini et al. | |
| 2014/0280889 A1 | 9/2014 | Nispel et al. | |
| 2015/0161518 A1 | 6/2015 | Mccann | |
| 2015/0195155 A1 | 7/2015 | Seol et al. | |
| 2015/0350039 A1 | 12/2015 | Narasimhamurthy | |
| 2016/0094574 A1 | 3/2016 | Hsueh et al. | |

OTHER PUBLICATIONS

Perelman, et al. "Flow signatures of popular applications," 12th IFIP/IEEE International Symposium on Integrated Network Management (IM 2011) and Workshops, 2011, pp. 9-16 (Year: 2011).*
"Search engine." Merriam-Webster.com. 2019. https://www.merriam-webster.com (Sep. 11, 2019). (Year: 2019).*
C. Ulmer and M. Gokhale, "A configurable-hardware document-similarity classifier to detect web attacks," 2010 IEEE International Symposium on Parallel & Distributed Processing, Workshops and Phd Forum (IPDPSW), Atlanta, GA, 2010, pp. 1-8. (Year: 2010).*
J. Y. Chung, B. Park, Y. J. Won, J. Strassner and J. W. Hong, "An effective similarity metric for application traffic classification," 2010 IEEE Network Operations and Management Symposium—NOMS 2010, Osaka, 2010, pp. 286-292. (Year: 2010).*
Y. Wang, Y. Xiang and S. Yu, "Internet Traffic Classification Using Machine Learning: A Token-based Approach," 2011 14th IEEE International Conference on Computational Science and Engineering, Dalian, 2011, pp. 285-289. (Year: 2011).*
B. Park, J. W. Hong and Y. J. Won, "Toward fine-grained traffic classification," in IEEE Communications Magazine, vol. 49, No. 7, pp. 104-111, Jul. 2011. (Year: 2011).*
W. D. Kenworthy, "Smarter searching for a network packet database," 2010 16th Asia-Pacific Conference on Communications (APCC), Auckland, 2010, pp. 526-530. (Year: 2010).*
Y. Zhang and J. Li, "Research and Improvement of Search Engine Based on Lucene," 2009 International Conference on Intelligent Human-Machine Systems and Cybernetics, Hangzhou, Zhejiang, 2009, pp. 270-273 (Year: 2009).*
"U.S. Appl. No. 14/304,136, Advisory Action dated Jun. 28, 2017", 3 pages.
"U.S. Appl. No. 14/304,136, Examiner Interview Summary dated Feb. 7, 2017", 3 pages.
"U.S. Appl. No. 14/304,136, Examiner Interview Summary dated Jun. 28, 2017", 2 pages.
"U.S. Appl. No. 14/304,136, Examiner Interview Summary dated Jul. 13, 2017", 2 pages.
"U.S. Appl. No. 14/304,136, Final Office Action dated Mar. 9, 2017", 20 pages.
"U.S. Appl. No. 14/304,136, Non Final Office Action dated Nov. 2, 2016", 25 pages.
"U.S. Appl. No. 14/304,136, Notice of Allowance dated Aug. 10, 2017", 11 pgs.
Arp, Daniel et al., "DREBIN: Efficient and Explainable Detection of Android Malware in Your Pocket", Technical Reports of the Institute of Computer Science, Georg-August-Universitat Gottingen, Aug. 2013.
Blasing, Thomas et al., "An Android Application Sandbox System for Suspicious Software Detection", 5th International Conference on Malicious and Unwanted Software (Malware), Oct. 2010, 55-62.
Choi, Yeongrak et al., "Automated Classifier Generation for Application-Level Mobile Traffic Identification", 2012 IEEE Network Operations and Management Symposium, 2012, 1075-1081.
Lahmadi, Abdelkader et al., "A Platform for the Analysis and Visualization of Network Flow Data of Android Environments", IFIP/IEEE International Symposium on Integrated Network Management (IM), 2015, 1129-1130.
Miskovic, et al., "AppPrint: automatic fingerprinting of mobile applications in network traffic", International Conference on Passive and Active Network Measurement, 2015, 57-69.
Ranjan, et al., "Approximate Matching of Persistent LExicon using Search-Engines for Classifying Mobile App Traffic", The 35th Annual IEEE International Conference on Computer Communications, 2016, 1-9.
Tongaonkar, , "A Look at the Mobile App Identification Landscape", IEEE Internet Computing, vol. 20, No. 4, Jul.-Aug. 2016, 9-15.
Tongaonkar, et al., "Challenges in Network Application Identification", LEET 12 Proceedings of the 5th USENIX conference on Large-Scale Exploits and Emergent Threats, 2012, 1-3.
Xu, et al., "Automatic Generation of Mobile App Signatures from Traffic Observations", 2015 IEEE Conference on Computer Communications, 2015, 1481-1489.
Yao, et al., "SAMPLES: Self Adaptive Mining of Persistent LExical Snippets for Classifying Mobile Application Traffic", Proceedings of the 21st Annual International Conference on Mobile Computing and Networking, Sep. 7-11, 2015, 439-451.

* cited by examiner

Table 1

```
<IndDoc>
    <field name="ID"> AppID(M) </field>
    <field name="PackageName"> packageName(M) </field>
    <field name="HostName"> Host_1, Host_2, ..., Host_h </field>
    <field name="URIPath"> URI_1, URI_2, ..., URI_u </field>
    <field name="Keys"> Key_1, Key_2, ..., Key_K </field>
</IndDoc>
```

*FIG. 4*

Table 2

```
<IndDoc>
<field name="ID"> ab.jumper.happy.jump.free.fan </field>
<field name="PackageName"> ab.jumper.happy.jump.free.fan </field>
<field name="HostName"> www.google-analytics.com, https://api.airpush.com </field>
<field name="URIPath"> model, user, getappinfo.php, api.php</field>
<field name="Keys"> packageName, apiKey, utmvw, utmn, utmt </field>
</IndDoc>
```

FIG. 5

Table 3

```
<PacketHeader>
<field name="HostName"> www.google-analytics.com </field>
<field name="SrcIP"> 10.0.2.15 </field>
<field name="DstIP"> 74.125.135.139 </field>
<field name="UserAgent"> GoogleAnalytics/1.4.2 (Linux; U; Android 4.3; JB_MR2) </field>
<field name="URIPath"> /__utm.gif</field>
<field name="QueryParam">
utmwv=4.8.1ma&utmn=2124823733&utmt=event&utme=5(App*ReadManualPrefs%3A%
20saving%20mSubId%20for%20first%20time*00000000000000%2F4445%2F279%2Fab.j
umper.happy.jump.free.fan-bonfire_137
</field>
</PacketHeader>
```

FIG. 6

Table 4

```
<QueryDoc>
<field name="HostName"/> www.google-analytics.com </field>
<field name="URIPath"/> __utm.gif </field>
<field name="Keys"/> utmwv, utmn, utmt, utme </field>
</QueryDoc>
```

MOBILE APPLICATION IDENTIFICATION IN NETWORK TRAFFIC VIA A SEARCH ENGINE APPROACH

CROSS-REFERENCE TO RELATED APPLICATIONS

This application is a continuation of and claims benefit of priority under 35 U.S.C. § 120 to U.S. application Ser. No. 14/304,136, entitled "Mobile Application Identification in Network Traffic Via A Search Engine Approach," filed on Jun. 13, 2014, now U.S. Pat. No. 9,853,876, issued on Dec. 26, 2017, which is incorporated herein by reference in its entirety.

BACKGROUND OF THE INVENTION

A mobile app is a computer program designed to run on smartphones, tablet computers and other mobile devices. The term "mobile app" or simply "app" refers to a mobile software application. Apps are usually available through application distribution platforms that are typically operated by the provider of the mobile operating system, such as the "App Store®" operated by Apple, Inc., "Google Play®" operated by Google Inc., "Windows Phone Store" operated by Microsoft Inc., etc. These application distribution platforms typically take the form of an online store (commonly referred to as an application market place), where users can browse through different app categories, view information about each app (such as reviews or ratings), and select the app. The selected app is offered as an automatic download, after which the app install. Usually, the selected app is downloaded from the platform to a target device, such as a particular mobile device (e.g., iPhone®, Android® phone, Windows Phone®, etc.) installed with a corresponding mobile operating system. However, the selected app may also be downloaded to laptop or desktop computers in certain situation.

SUMMARY

In general, in one aspect, the present invention relates to a method for identifying a network application. The method includes analyzing, by a processor of a computer system, a source code of a network application, among a plurality of network applications, to extract a plurality of source code tokens, generating an index document of the network application based on the plurality of source code tokens, wherein the index document is included in a plurality of index documents corresponding to the plurality of network applications, extracting, by the processor, a plurality of packet header tokens from a packet header of a packet in a flow, comparing, by the processor, the plurality of packet header tokens to the plurality of index documents to generate a plurality of match scores, wherein each of the plurality of match scores represents a similarity measure between the plurality of packet header tokens and one of the plurality of index documents, and determining, based at least on a match score of the plurality of match scores and corresponding to the network application, that the flow is generated by the network application.

In general, in one aspect, the present invention relates to a system for identifying a network application. The system includes a processor of a computer system, memory comprising instructions executable by the processor, wherein the instructions comprises (i) a network application analyzer configured to analyze a source code of a network application, among a plurality of network applications, to extract a plurality of source code tokens, and generate an index document of the network application based on the plurality of source code tokens, wherein the index document is included in a plurality of index documents corresponding to the plurality of network applications, (ii) a flow analyzer configured to extract a plurality of packet header tokens from a packet header of a packet in a flow, and (iii) a correlation analyzer configured to compare the plurality of packet header tokens to the plurality of index documents to generate a plurality of match scores, wherein each of the plurality of match scores represents a similarity measure between the plurality of packet header tokens and one of the plurality of index documents, and determine, based at least on a match score of the plurality of match scores and corresponding to the network application, that the flow is generated by the network application, and a repository configured to store the a plurality of index documents.

In general, in one aspect, the present invention relates to a computer readable medium storing instructions, when executed by the computer to identify a network application, the instructions include functionality for analyzing a source code of a network application, among a plurality of network applications, to extract a plurality of source code tokens, generating an index document of the network application based on the plurality of source code tokens, wherein the index document is included in a plurality of index documents corresponding to the plurality of network applications, extracting a plurality of packet header tokens from a packet header of a packet in a flow, comparing the plurality of packet header tokens to the plurality of index documents to generate a plurality of match scores, wherein each of the plurality of match scores represents a similarity measure between the plurality of packet header tokens and one of the plurality of index documents, and determining, based at least on a match score of the plurality of match scores and corresponding to the network application, that the flow is generated by the network application.

Other aspects and advantages of the invention will be apparent from the following description and the appended claims.

BRIEF DESCRIPTION OF DRAWINGS

FIG. 4 shows a table representing an example structure of an index document according to aspects of the invention.

FIG. 5 shows a table representing an example index document according to aspects of the invention.

FIG. 6 shows a table representing various fields in a packet header according to aspects of the invention.

FIG. 7 shows a table representing an example query document according to aspects of the invention.

DETAILED DESCRIPTION

Figure 1:
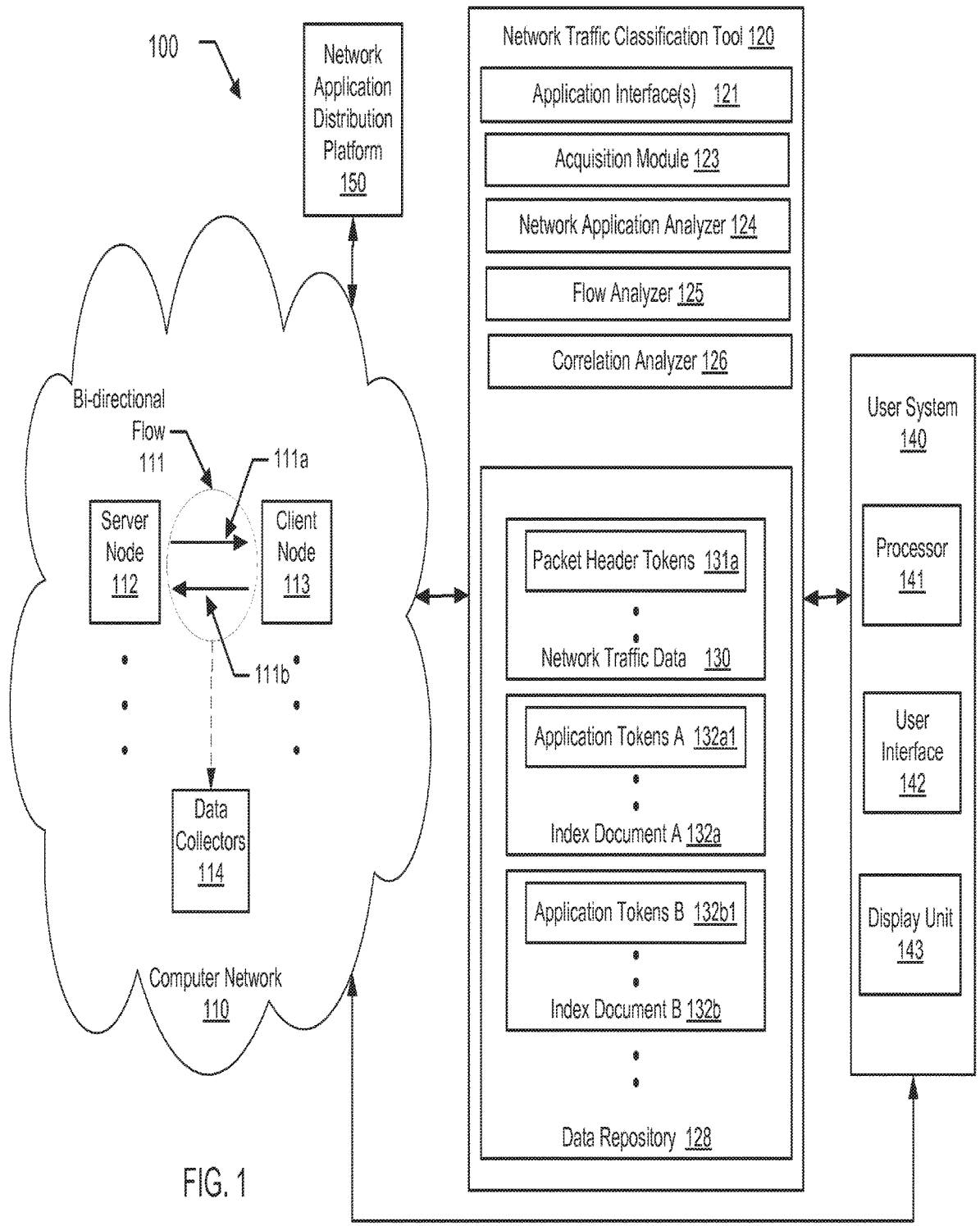
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP, UDP, etc.

Packet capture is the act of capturing data packets crossing a network. Partial packet capture may be performed to record headers without recording the total content of corresponding payloads. Deep packet capture may be performed to capture complete network packets including each packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

Generally, embodiments of the invention provide a system and method to analyzing network traffic to identify network applications responsible for generating the traffic on a per packet basis.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network traffic classification tool (120), a network application distribution platform (150), a user system (140), and a computer network (110). The network traffic classification tool (120) includes a data repository (128), one or more application interfaces (121), an acquisition module (123), a network application analyzer (124), a flow analyzer (125), and a correlation analyzer (126). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the network (110).

As shown in FIG. 1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of a network application executing on the server node (112) and the client node (113). In this context, the bi-directional flow (111) is referred to as being generated by the network application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113). In one or more embodiments, the client portion of the network application is downloaded from the network application distribution platform (150) and installed on the client node (113). In one or more embodiments, the network application is a mobile app where the client portion of the application is downloaded from the network application distribution platform (150) and installed on a mobile device (i.e., the client node (113), such as iPhone®, Android® phone, Windows Phone®, etc.).

In one or more embodiments, the application distribution platform (150) includes an online store, and one or more severs of the online store, that are operated by the provider of a mobile operating system, such as the "App Store®" operated by Apple, Inc., "Google Play®" operated by Google Inc., "Windows Phone Store" operated by Microsoft Inc., etc.

In one or more embodiments, certain device(s) (e.g., data collectors (114)) within the computer network (110) may be configured to collect network data (e.g., bi-directional flow (111)) for providing to the network traffic classification tool (120). Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., bi-directional flow (111)) from the computer network (110) and/or store received data to the data repository (128). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface (121) from tune to tune to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with an analyst user using the user interface (142). The user interface (142) may be configured to receive data and/or instruction(s) from the analyst user. The user interface (142) may also be configured to deliver information (e.g., a report or an alert) to the analyst user. In addition, the user interface (142) may be configured to send data and/or instruction(s) to, and receive data and/or information from, the network traffic classification tool (120). The analyst user may include, but is not limited to, an individual, a group, an organization, or some other entity having authority and/or responsibility to access the network traffic classification tool (120). Specifically, the context of the term "analyst user" here is distinct from that of a user of the computer network (110), the client node (113), and or the network application executing on the client node (113). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.).

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic classification tool (120), the user system (140), and the communication links may be part of the computer network (110).

In one or more embodiments, a central processing unit (CPU, not shown) of the network traffic classification tool (120) is configured to execute instructions to operate the components of the network traffic classification tool (120). In one or more embodiments, the memory (not shown) of the network traffic classification tool (120) is configured to store software instructions for performing the functionality of the network traffic classification tool (120). The memory may be one of a variety of memory devices, including but not limited to random access memory (RAM), read-only memory (ROM), cache memory, and flash memory. The memory may be further configured to serve as back-up storage for information stored in the data repository (128).

The network traffic classification tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic classification tool (120) is configured to obtain and store data in the data repository (128). In one or more embodiments, the data repository (128) is a persistent storage device (or set of devices) and is configured to receive data from the computer network (110) using the application interface (121). The data repository (128) is also configured to deliver working data to, and receive working data from, the acquisition module (123), network application analyzer (124), flow analyzer (125), and attack campaign inference engine (126). The data repository (128) may be a data store (e.g., a database, a file system, one or more data structures configured in a memory, some other medium for storing data, or any suitable combination thereof), which may include information related to the network traffic classification. Such information may include network traffic data (e.g., network traffic data (130)) captured from the computer network (110) and index documents (e.g., index document A (132*a*), index document B (132*b*)) associated with network applications executing in the computer network (110). The data repository (128) may be a device internal to the network traffic classification tool (120). Alternatively, the data repository (128) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as the network traffic data (130), etc. In one or more embodiments of the invention, the network traffic data (130) includes HTTP traffic data.

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow (e.g., uni-directional flows (111*a*), (111*b*)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the network application analyzer (124) is configured to analyze a source code of a network application to extract a set of application tokens that are used to generate an index document of the network application. Typically, there is a large number of network applications executing in the computer network (110) where an index document may be generated from the source code of each of these network applications. For example, the index document A (132*a*) corresponds to a network application A (not shown) and includes application tokens (e.g., application tokens A (132*a*1), etc.) extracted from the source code of the network application A (not shown). Similarly, the index document B (132*b*) corresponds to a network application B (not shown) and includes application tokens (e.g., application tokens B (132*b*1), etc.) extracted from the source code of the network application B (not shown).

In one or more embodiments, the source code is converted, using a de-compiler tool, from an executable binary file of the network application. For example, the executable binary file may be obtained (e.g., downloaded) from the network application distribution platform (150). In one or more embodiments, additional application tokens may also be extracted from additional information obtained from the network application distribution platform (150) and used to construct the index document of the network application. The executable binary file and additional information associated with the executable binary file are collectively referred to as an executable binary file package (also referred to as a executable binary archive or a download package). In one or more embodiments, the network application analyzer (124) generates the index document A (132*a*) for the network application A (not shown), the index document B (132*b*) for the network application B (not shown), etc. using the method described in reference to FIG. 2 below. An example of generating the index document is described in reference to TABLES 1-4 below.

In one or more embodiments of the invention, the flow analyzer (125) is configured to extract a set of packet header tokens from a packet header of a packet in a flow. In one or more embodiments, the flow is captured from the computer network (110) and stored in the repository (128) as part of the network traffic data (130). For example, the set of packet header tokens is shown as the packet header tokens (131*a*). In one or more embodiments, the flow analyzer (125) extracts the packet header tokens (131*a*) using the method described in reference to FIG. 2 below. An example of extracting packet header tokens is described in reference to TABLES 1-4 below.

In one or more embodiments of the invention, the correlation analyzer (126) is configured to compare the packet header tokens (131*a*) to the index documents (e.g., index document A (132*a*) for the network application A (not shown), the index document B (132*b*), etc.) stored in the repository (128) to generate a match score (not shown) for each compared index document. Specifically, each match score represents a similarity measure between the packet header tokens (131*a*) and one of the compared index document. Accordingly, the correlation analyzer (126) determines, from among all the compared network applications, the particular network application that generates the flow where the packet header tokens (131*a*) are extracted. In other words, the correlation analyzer (126) classifies the flow as generated by the particular network application whose index document exhibits the highest similarity (as measured by the match score), among all network applications, when compared to the packet header tokens (131*a*) extracted from the flow. In one or more embodiments, the correlation analyzer classifies the flow containing the packet header tokens (131*a*) using the method described in reference to FIG. 2 below. An example of generating the match score and classifying the flow is described in reference to TABLES 1-4 below.

Figure 2:
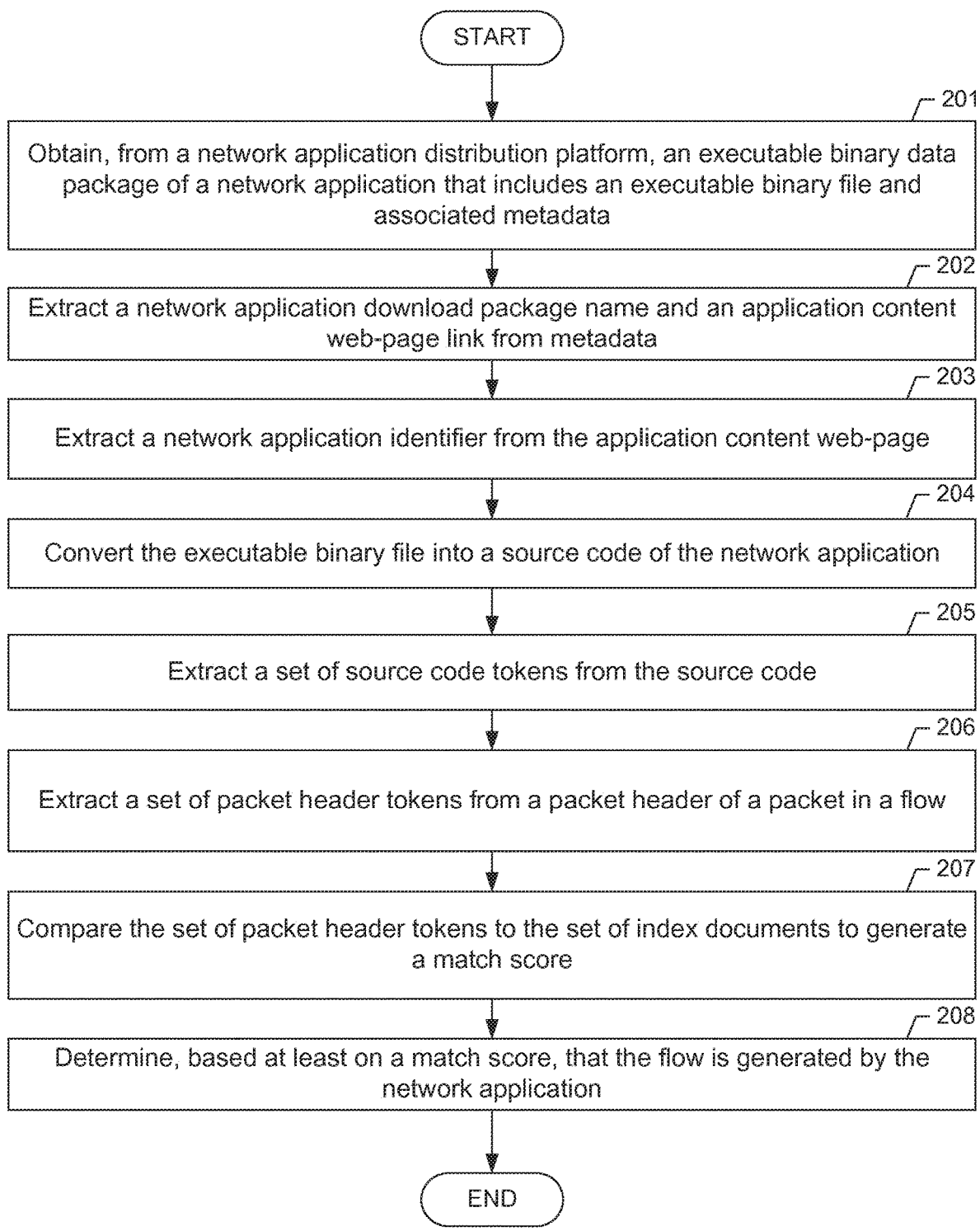
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

Initially in Step 201, an executable binary data package of a network application is obtained, for generating a corresponding index document, from a network application distribution platform. Typically, there is a large number of network applications executing in the computer network where an index document may be generated from the executable binary data package of each of these network applications. Further, the large number of network applications may be associated with multiple operating systems where a separate network application distribution platform exists for each of the multiple operating systems. Accordingly, the executable binary data package is obtained from a particular network application distribution platform corresponding to the operating system under which the network application may executes. In particular, different executable binary data packages may be obtained from different network application distribution platforms for different versions of the same network application where each of the different versions is executable under a respective operating system. In one or more embodiments, an index document is generated, based on a corresponding executable binary data package obtained (e.g., downloaded) from a corresponding network application distribution platform, for each version of each network application executing in the compute network. In one or more embodiments, the executable binary data package includes an executable binary file and metadata associated with the executable binary file.

In Step 202, a network application download package name of the executable binary data package and/or a link to an application content webpage are obtained/extracted from the metadata. The network application download package name is generally assigned by a provider of the network application download package to identify the executable binary data package. Different formats of the network application download package name may be found in different network application distribution platforms based on specifics of corresponding operating systems. In addition, the application content webpage may be generated and maintained by the provider of the network application to describe various aspects of the network application to potential and actual users of the network application.

In Step 203, in response to obtaining the link, a network application identifier is extracted from the application content webpage. Different formats of the network application identifier may be found in different network application distribution platforms based on specifics of corresponding operating systems. For certain operating system, the network application identifier and the network application download package name may be the same.

In Step 204, the source code is converted, using a de-compiler tool, from the executable binary file.

In Step 205, a set of source code tokens is extracted from the source code. In one or more embodiments, one or more universal resource locator (URL) strings and one or more key declaration strings are extracted from the source code. Further, the source code tokens are extracted from these URL strings and key declaration strings. For example, domain host names, universal resource identifier (URI) path strings, and keys may be extracted from the one or more URL strings as the source code tokens. Additional keys may also be extracted from the one or more key declaration strings as additional source code tokens. Example details of extracting the source code tokens are described in reference to FIGS. 3.1 to 3.4 below.

In Step 206, a set of packet header tokens is extracted from a packet header of a packet in a flow. In one or more embodiments, the set of packet header tokens are extracted based on various fields contained in the packet header as defined by the network communication protocol. Example packet header tokens are described in reference to TABLES 1-4 below.

In Step 207, the set of packet header tokens and the set of index documents are compared to generate a match score for each of the index document. Specifically, each match score represents a similarity measure between the set of packet header tokens and a corresponding index documents being compared. In one or more embodiments, the match score is generated by comparing the set of packet header tokens to the set of source code tokens of the corresponding network application. In particular, the match score represents the similarity measure of the set of packet header tokens as compared to the set of source code tokens. In one or more embodiments, the match score is generated by comparing the set of packet header tokens to the network application identifier, the network application download package name, the domain host names, the URI path strings, and the keys that are extracted from the network application download package.

In Step 209, the flow is determined as being generated by the network application whose index document shows highest similarity with the set of packet header tokens extracted from the flow.

An example in accordance with aspects of the invention is described below in reference to TABLES 1-4 below. The examples described in TABLES 1-4 may be based on the system (100) described in reference to FIG. 1 and the method described in reference to FIG. 2 above. In particular, the example described in TABLES 1-4 focuses on a solution for identifying mobile applications responsible for generating packets observed in the network, using a search engine paradigm. The methodology is generic and works for mobile applications across all popular smartphone mobile platforms (e.g. Android®, BlackBerry®, iOS®, Nokia Symbian® S40/S60 and Windows® Mobile). The example methodology involves the creation of a corpus of index documents loaded a priori into a commercial search engine (e.g., Apache Solr/Lucene platform known to those skilled in the art) in the following way. For a given mobile application M, a unique index document ID(M) is created through lexical analysis (e.g., parsing, tokenization and categorization) of three different data sources associated with M. First, the application description (e.g., the aforementioned application content webpage) page for M that is available in the marketplace (e.g., the aforementioned application online store), which provides application name and category. Second, the application metadata files found in the executable archive (i.e., download package) of M that provide various identifiers and access permissions associated with the application. And finally, the executable binaries for M from which relevant network activity related tags and context are extracted. For example, the executable binaries may be converted (e.g., decompiled to the SMALI intermediate language format using the publicly available Android® 'aapt-apktool' or running the 'string' Unix system command) into Android® source code from which the tags and context are extracted. Upon completion, this process generates a structured corpus of index documents. Specifically, one index document is generated for each mobile application available in the marketplace. In other words, if M={M1, M2, . . . , Mn} be the set of all mobile applications in the Android® and iOS® marketplaces, then corpus is defined by C={ID(M1), ID(M2), . . . , ID(Mn)}. Clearly, each index document has an identifier field that associates it with a specific mobile app. This corpus, C, is then loaded into a commercial search engine (e.g., Apache Solr/Lucene platform) which forms the operational system using the corpus C as the search index.

Given a packet P, observed in the computer network, a sequence of lexical pre-processing steps (e.g., parsing, tokenization, categorization) are performed to create a query document Q(P). Note that this pre-processing is, in essence, similar to the one performed to create the corpus index documents in C, as described in the previous paragraph. Q(P), therefore, has the same lexical structure as that of the index documents. Q(P) is then passed as a query to the Search Engine which returns a numerical similarity score for Q(P) vis-è-vis every index document in C. Precisely, let Si be the search engine match score obtained for Q(P) with ID(Mi) and the set of scores be denoted as S={S1, S2, . . . , Sn}. The system then identifies the application responsible for producing the packet P, as the one whose index document had the highest lexical matching score with Q(P).

The Search Engine Index

For a given mobile application M, the application content webpage W and the executable binary archive (i.e., the aforementioned network application download package) E, are downloaded from the application market place (e.g., iTunes store®, Google Play®). Typically, the webpage W provides an unique application content id (i.e., the aforementioned network application identifier) and an application name that may not necessarily be unique. The content id has different forms and functions across platforms: for the Android platform, it is in a reverse package name format (e.g., ab.jumper.happy.jump.free.fan) while in the case of iOS® it is a 9-digit id (e.g., 282935706). Similarly, in terms of function, while on the Android® and iOS® platforms the content id is the same as the application executable identifier (i.e., the aforementioned network application download package name) found in the metadata associated with the executable binary archive E, whereas in the case of Nokia® and Windows Mobile®, the content id and the application executable identifiers are different.

The executable binary archive F is then processed, to extract the following:

(i) Metadata files: Files containing information about resources and/or information accessed by M (e.g., Manifest file for an Android® application lists whether or not an application needs network access permissions, contact list information etc., while info.plist file contains identifiers for iOS® applications.)

(ii) Source code files: Application source code in an intermediate language format.

The contents of both types of files listed above are in the standard ASCII text format. A lexical parser is then used to extract the following texts of interest:

(i) Network application identifiers: A unique identifier found in the metadata files that is assigned to the mobile application M by the developers of M. As stated earlier, the network application identifier need not necessarily be the same as content id.

URL strings: URL strings in the standard URL format; (e.g., http://cus.adwhirl.com/custom.php?appid=%s&nid=%s&uuid=%s). Each such URL string U contains a domain host name (e.g., http://cus.adwhirl.com). In addition, it may contain a URI path string (e.g., /custom.php) as well as query parameters (e.g., appid=%s&nid=%s&uuid=%s). A URI path may be identified by the forward slash delimiter following the domain host name, and terminated by question mark or end of string. A query parameter may be identified by the question mark or "&" delimiter, and terminated by equal sign). These URL strings are extracted from the source code files. The network behavior of M may be characterized by communications with a subset of these hosts using the same URL strings as found in the source code.

(iii) Key declarations: Key/value pairs declared/initialized in the source code files (e.g., const-string v1, "&fb_exp="). For example, a key in the key declaration may be identified by a leading string const-string vn, "& (where n is a version number), and terminated by equal sign. Such declarations are often used as part of coding conventions and may be extracted to provide additional prospective query parameters over and above those hardcoded in URL strings.

Given the labeled test strings thus extracted, an index document for application M, denoted henceforth as ID(M), may be constructed. TABLE 1, as shown in FIG. 4, shows an example structure of the index document including (i) "ID" field for storing the aforementioned network application identifier extracted from application content webpage, (ii) "PackageName" field for storing the aforementioned network application download package name, (iii) "HostName" field for storing the host name extracted from the URL strings found in the source code, (iv) "URIPath" field for storing the URI paths extracted from the URL strings found in the source code, and (v) "Keys" field for storing the keys extracted from the ULR strings and/or the key declarations found in the source code.

An Example for the Android® Platform:

The example below describe the index document creation process. Consider an application M with the name "Happy Jump Free", downloadable from the Google Play® application market place. For this app, the file name (i.e., the aforementioned network application download package name) of the application executable archive E is ab.jumper.happy.jump.free.fan-1.apk. This file name is also found in the application content webpage as the unique application content id (i.e., the aforementioned network application identifier). As noted above, the application name "Happy Jump Fan Free" is also found in the application content webpage but may not be unique. The application executable archive E is downloaded and decompiled to obtain:

(i) Metadata files: AndroidManifest.xml and apktool.yml (ii) Source code files in an intermediate language format.

A sample set of URL strings extracted from the source code files is given below:

www.google-analytics.com https://api.airpush.com/model/user/getappinfo.php?packageName= https://api.airpush.com/v2/api.php?apikey=

From each URL string, the domain host names (i.e., www.google-analytics.com, https://api.airpush.com) are extracted and stored in the "HostName" field of the index document. In addition, the URI path strings (i.e., model, user, getappinfo.php, v2, api.php) are extracted and stored in the "URIPath" field of the index document. Further, a number of keys (i.e., packageName, apiKey) are extracted and stored in the "Keys" field of the index document.

In addition to the keys extracted from URL strings in the source code, key declaration strings are extracted from the source code files to generate additional keys. Examples of the key declaration strings are listed below:

const-string v3, "?utmwv=4.8.1ma"

const-string v3, "&utmn="

const-string v3, "&utmt=event"

From these key declaration strings, additional keys (i.e., utmvw, utmn, utmt) are extracted and further stored in the "Keys" field of the index document.

TABLE 2, as shown in FIG. 5, shows an example index document based on the example structure defined in TABLE 1 above. Specifically, various fields in the example index document contains application tokens such as the network application identifier extracted from the application content webpage, the network application download package name (without the file extension .apk) extracted from the metadata, and the source code tokens (i.e., host names, URI path strings, and keys) extracted from the source code. For example, these application tokens may be extracted to generate the index document by the network application analyzer depicted in FIG. 1 above.

While the application content id and the download package file name are the same for Android® Platform, for an iOS® app, the application content id is a 9-digit number found in the application content webpage whereas the download package name may be referred to in the metadata files as the cfbundleidentifier/softwareversionbundleid.

Similar index documents are constructed for all the apps in the marketplace to form an index document corpus.

Packet Analyzer and Query Constructor

For a given packet P, intercepted at a vantage point (e.g., WiFi access point, router), the packet header information contained in P is parsed and tokenized to obtain contents of various field defined by the communication protocol. TABLE 3, as shown in FIG. 6, shows an example of various fields in a packet header.

For each packet P, the flow analyzer depicted in FIG. 1 above extracts contents from various fields in the packet header as packet header tokens. These packet header tokens are used to create a query document Q(P). TABLE 4, as shown in FIG. 7, shows an example query document.

For each network packet P, the query document Q(P), is used to query the search engine index described in above. The search engine generates a match score for the given query for each indexed document in its index set. For example, the match score assigned to an index document for the given query may be computed by tallying entries in the index document that match the entries in the query document. The computed tally may be normalized based on total number of entries in the index document to generate the match score. Further, each entry in the index document may be assigned a priority weighting (e.g., a number representing priority or importance) for computing the tally. Specifically, an index document entry having a higher priority weighting contributes more to the tally when the index document entry (referred to as a matching entry) is matched by a query document entry. In other words, contributions of the matching entries to the match score are proportional to the corresponding priority weightings. For example, the priority weighting may be assigned to prioritize the index document entries in the order of Package Name>HostName>URI>Keys>Values. This is because Package Names are unique, while HostNames may be shared across multiple apps. In general, higher priority weightings are assigned to those fields that have a higher probability of being unique across all network applications in the computer network.

In the example described herein, the index document ID(M1) may have the highest match score among all index documents in the corpus. Accordingly, the application content id (i.e., the aforementioned network application identifier stored in the "ID" field of the index document) found in the index document ID(M1) is returned as the match. In other words, the application identified by this returned application content id is determined as the particular application that generates the packet, as well as generates the flow containing the packet. the In case of ties, the algorithm returns multiple possible matches for the packet. This is referred to as a fuzzy match.

Figure 3:
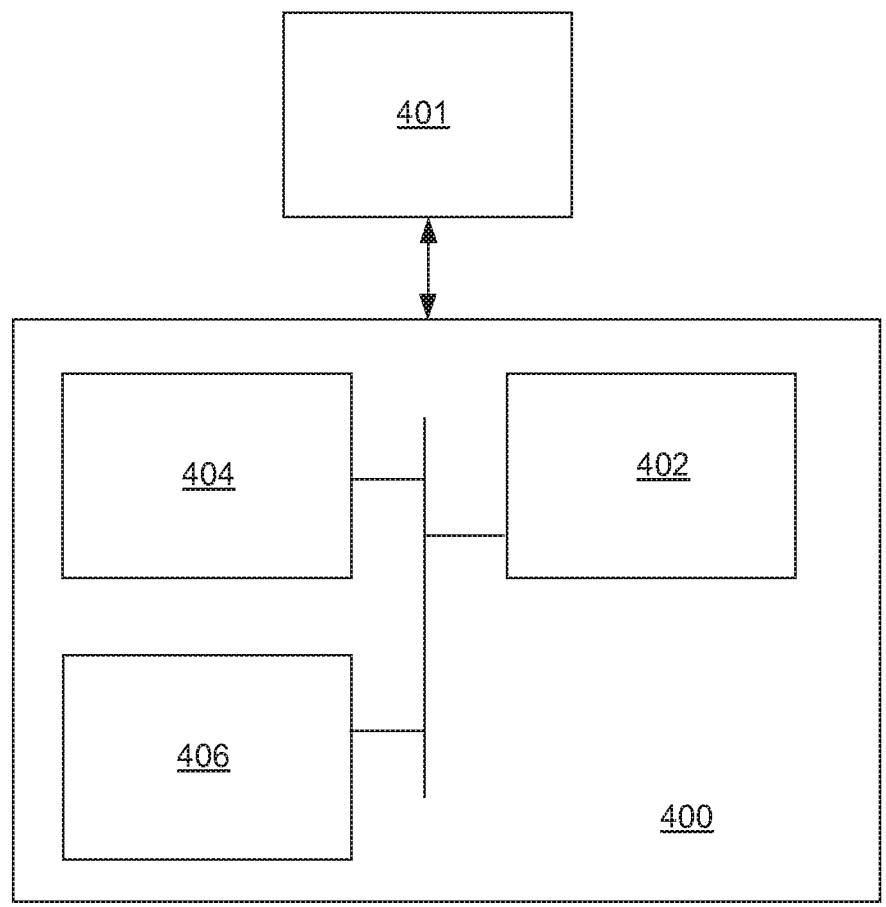
FIG. 3 shows a computer system according to aspects of the invention.

Embodiments of the invention may be implemented on virtually any type of computer regardless of the platform being used. For example, as shown in FIG. 3, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying a network application, comprising:
obtaining, by a processor, from a network application distribution platform, an executable binary data package of the network application, wherein the executable binary data package comprises an executable binary file and metadata associated with the executable binary file;

extracting, by the processor, a network application download package name of the executable binary data package from the metadata to obtain first application tokens comprising the network application download package name of the executable binary data package;

obtaining, by the processor, from the network application distribution platform, a link to an application content webpage;

extracting, by the processor, in response to obtaining the link, a network application identifier from metadata of the application content webpage to obtain second application tokens based on the network application identifier;

generating, by the processor, an index document of the network application based on a plurality of source code tokens, the first application tokens, and the second application tokens, wherein the index document is included in a plurality of index documents corresponding to a plurality of network applications;

extracting, by the processor, a plurality of packet header tokens from a packet header of a packet in a flow to generate one or more query documents;

comparing, by the processor using a commercial search engine, the plurality of packet header tokens of the one or more query documents to the plurality of index documents to generate a plurality of match scores; and determining, by the processor, based at least on a match score of the plurality of match scores, that the flow is generated by the network application.

2. The method of claim 1, wherein generating the match score of the plurality of match scores comprises:

comparing the plurality of packet header tokens to the plurality of source code tokens, wherein the match score represents a similarity measure of the plurality of packet header tokens as compared to the plurality of source code tokens.

3. The method of claim 1, further comprising:

extracting, from a source code of the network application, a plurality of universal resource locator (URL) strings and a plurality of key declaration strings; and further extracting a plurality of domain host names, a plurality of universal resource identifier (URI) path strings, and a first plurality of keys from the plurality of URL strings, as well as a second plurality of keys from the plurality of key declaration strings.

4. The method of claim 3, wherein generating the match score of the plurality of match scores comprises:

comparing the plurality of packet header tokens to the network application identifier, the network application download package name, the plurality of domain host names, the plurality of URI path strings, the first plurality of keys, and the second plurality of keys.

5. The method of claim 4, wherein the match score represents a similarity measure of the plurality of packet header tokens as compared to the network application identifier, the network application download package name, the plurality of domain host names, the plurality of URI path strings, the first plurality of keys, and the second plurality of keys.

6. The method of claim 3, wherein the plurality of source code tokens includes the plurality of domain host names, the plurality of URI path strings, the first plurality of keys, and the second plurality of keys.

7. The method of claim 1, further comprising:

converting, using a de-compiler tool, the executable binary file into the source code.

8. A system for identifying a network application, comprising:

a processor of a computer system; memory comprising instructions executable by the processor, the instructions when executed by the processor comprising functionality for:

obtaining, from a network application distribution platform, an executable binary data package of the network application, wherein the executable binary data package comprises an executable binary file and metadata associated with the executable binary file;

extracting a network application download package name of the executable binary data package from the metadata to obtain first application tokens comprising the network application download package name of the executable binary data package;

obtaining, from the network application distribution platform, a link to an application content webpage;

extracting, in response to obtaining the link, a network application identifier from metadata of the application content webpage to obtain second application tokens based on the network application identifier;

generating an index document of the network application based on a plurality of source code tokens, the first application tokens, and the second application tokens, wherein the index document is included in a plurality of index documents corresponding to a plurality of network applications;

extracting a plurality of packet header tokens from a packet header of a packet in a flow to generate one or more query documents;

comparing, using a commercial search engine, the plurality of packet header tokens of the one or more query documents to the plurality of index documents to generate a plurality of match scores; and determining, based at least on a match score of the plurality of match scores, that the flow is generated by the network application.

9. The system of claim 8, wherein generating the match score of the plurality of match scores comprises:

comparing the plurality of packet header tokens to the plurality of source code tokens, wherein the match score represents a similarity measure of the plurality of packet header tokens as compared to the plurality of source code tokens.

10. The system of claim 8. the instructions when executed by the processor further comprising functionality for:

extracting, from a source code of the network application, a plurality of universal resource locator (URL) strings and a plurality of key declaration strings; and further extracting a plurality of domain host names, a plurality of universal resource identifier (URI) path strings, and a first plurality of keys from the plurality of URL strings, as well as a second plurality of keys from the plurality of key declaration strings.

11. The system of claim 10, wherein generating the match score of the plurality of match scores comprises:

comparing the plurality of packet header tokens to the network application identifier, the network application download package name, the plurality of domain host names, the plurality of URI path strings, the first plurality of keys, and the second plurality of keys.

12. The system reclaim 11, wherein the match score represents a similarity measure of the plurality of packet header tokens as compared to the network application identifier, the network application download package name, the plurality of domain host names, the plurality of URI path strings, the first plurality of keys, and the second plurality of keys.

13. The system of claim 10, wherein the plurality of source code tokens includes the plurality of domain host names, the plurality of URI path strings, the first plurality of keys, and the second plurality of keys.

14. The system of claim 8, the instructions when executed by the processor further comprising functionality for:
converting, using a de-compiler tool, the executable binary file into the source code.

15. A non-transitory computer readable medium embodying instructions for identifying a network application, the instructions when executed by a processor comprising functionality for:
obtaining, from a network application distribution platform, an executable binary data package of the network application, wherein the executable binary data package comprises an executable binary file and metadata associated with the executable binary file;
extracting a network application download package name of the executable binary data package from the metadata to obtain first application tokens comprising the network application download package name of the executable binary data package;
obtaining, from the network application distribution platform, a link to an application content webpage;
extracting, in response to obtaining the link, a network application identifier from metadata of the application content webpage to obtain second application tokens based on the network application identifier;
generating an index document of the network application based on a plurality of source code tokens, the first application tokens, and the second application tokens, wherein the index document is included in a plurality of index documents corresponding to a plurality of network applications;
extracting a plurality of packet header tokens from a packet header of a packet in a flow to generate one or more query documents;
comparing, using a commercial search engine, the plurality of packet header tokens of the one or more query documents to the plurality of index documents to generate a plurality of match scores; and
determining, based at least on a match score of the plurality of match scores, that the flow is generated by the network application.

16. The non-transitory computer readable medium of claim 15, wherein generating the match score of the plurality of match scores comprises:
comparing the plurality of packet header tokens to the plurality of source code tokens, wherein the match score represents a similarity measure of the plurality of packet header tokens as compared to the plurality of source code tokens.

17. The non-transitory computer readable medium of claim 15, the instructions when executed by the processor further comprising functionality for:
extracting, from a source code of the network application, a plurality of universal resource locator (URL) strings and a plurality of key declaration strings; and
further extracting a plurality of domain host names, a plurality of universal resource identifier (URI) path strings, and a first plurality of keys from the plurality of URL strings, as well as a second plurality of keys from the plurality of key declaration strings.

18. The non-transitory computer readable medium of claim 17, wherein the plurality of source code tokens includes the plurality of domain host names, the plurality of URI path strings, the first plurality of keys, and the second plurality of keys.

19. The non-transitory computer readable medium of claim 17, wherein generating the match score of the plurality of match scores comprises:
comparing the plurality of packet header tokens to the network application identifier, the network application download package name, the plurality of domain host names, the plurality of URI path strings, the first plurality of keys, and the second plurality of keys, wherein the match score represents a similarity measure of the plurality of packet header tokens as compared to the network application identifier, the network application download package name, the plurality of domain host names, the plurality of URI path strings, the first plurality of keys, and the second plurality of keys.

20. The non-transitory computer readable medium of claim 15, the instructions when executed by the processor further comprising functionality for:
converting, using a de-compiler tool, the executable binary file into the source code.

* * * * *